United States Patent

[11] 3,565,200

| [72] | Inventors | Robert L. Siewert<br>St. Joseph;<br>Eugene F. Hand, Stevensville, Mich. |
|---|---|---|
| [21] | Appl. No. | 783,931 |
| [22] | Filed | Dec. 16, 1968 |
| [45] | Patented | Feb. 23, 1971 |
| [73] | Assignee | Clark Equipment Company |

[54] ARTICULATED VEHICLE DRIVE
3 Claims, 11 Drawing Figs.

[52] U.S. Cl. .................................................. 180/51;
 180/20
[51] Int. Cl. ...................................................... B60k 17/34,
 B62d 9/00
[50] Field of Search............................................ 180/50, 51,
 52, 20, 22 (C)

[56] References Cited
UNITED STATES PATENTS
1,373,981 4/1921 Smith............................ 180/50
1,627,225 5/1927 Babel et al..................... 180/22(C)UX
3,291,244 12/1966 Garrett........................... 180/51
3,299,981 1/1967 Garrett........................... 180/51

*Primary Examiner*—A. Harry Levy
*Attorneys*—Kenneth C. Witt, John C. Wiessler, Robert H. Johnson and Reginald J. Falkowski ABSTRACT: A drive arrangement for an articulated vehicle having two parts interconnected by a coupling structure which provides for pivoting about both vertically disposed and horizontally disposed axes. An engine is mounted on one part of the vehicle. A shaft driven by the engine extends in transversely disposed relation adjacent the vertically disposed axis, such shaft including a universal joint and a slip joint therein. A first mechanism along one side of the vehicle and connected to the shaft drives ground engaging propelling means on the other part of the vehicle, and a second mechanism along the other side of the vehicle and connected to the engine drives the ground engaging propelling means on the one part of the vehicle.

INVENTORS
ROBERT L. SIEWERT
EUGENE F. HAND
BY
Kenneth C. Witt
ATTORNEY

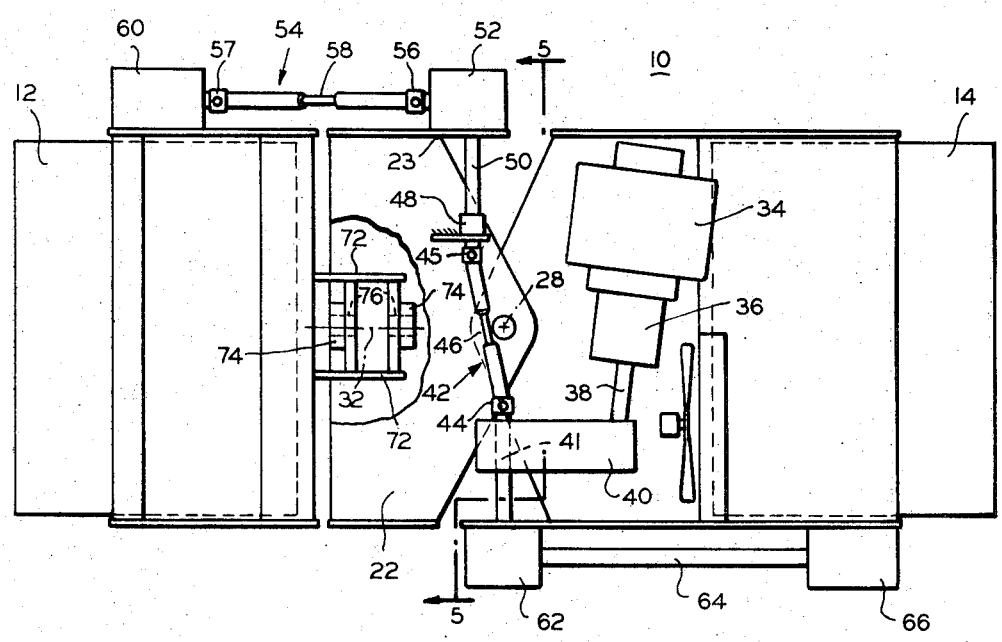

INVENTORS
ROBERT L. SIEWERT
EUGENE F. HAND
BY
*Kenneth C. Witt*
ATTORNEY

INVENTORS
ROBERT L. SIEWERT
EUGENE F. HAND
BY
*Kenneth C. Witt*
ATTORNEY

ARTICULATED VEHICLE DRIVE

BACKGROUND OF THE INVENTION

This invention relates to a drive arrangement for articulated vehicles, and for this purpose an articulated vehicle means one which has two parts connected together by a combined draft and steering coupling structure which includes means for pivoting one part of the vehicle about a horizontally disposed axis and also includes means for pivoting the two parts of the vehicle with respect to each other about a vertically disposed axis in order to steer the vehicle. Such articulated construction is utilized in many kinds of vehicles, particularly those intended for off-the-road operation such as tractor shovels and loaders, rubber tired bulldozers, log skidders and road rollers.

The invention is disclosed herein in three preferred embodiments involving road roller vehicles which have two large rolls, one mounted on the front part of the vehicle and the other on the rear part of the vehicle. It will be appreciated, however, by those skilled in the art that the invention is not limited to use with road rollers, but may be used with equal facility in other articulated vehicles as well.

SUMMARY OF THE INVENTION

In the best modes disclosed herein, this drive arrangement is shown in an articulated road roller vehicle. An engine is mounted on one part of the vehicle. A shaft driven by the engine extends in transversely disposed relation adjacent the vertically disposed axis about which the two parts of the vehicle pivot for steering, such shaft including a universal joint and a slip joint. A first mechanism along one side of the vehicle and connected to the transverse shaft drives the roller on one part of the vehicle while a second mechanism along the other side of the vehicle and connected to the engine drives the roller on the other part of the vehicle.

BRIEF DESCRIPTION OF THE DRAWING

FIG. 3 shows a top view similar to FIG. 1 except with some parts removed to reveal elements forming part of the invention, FIG. 4 is the same as FIG. 3 except with one part of the vehicle turned approximately 35° with respect to the other.

DESCRIPTION OF THE PREFERRED EMBODIMENTS

Figure 1:
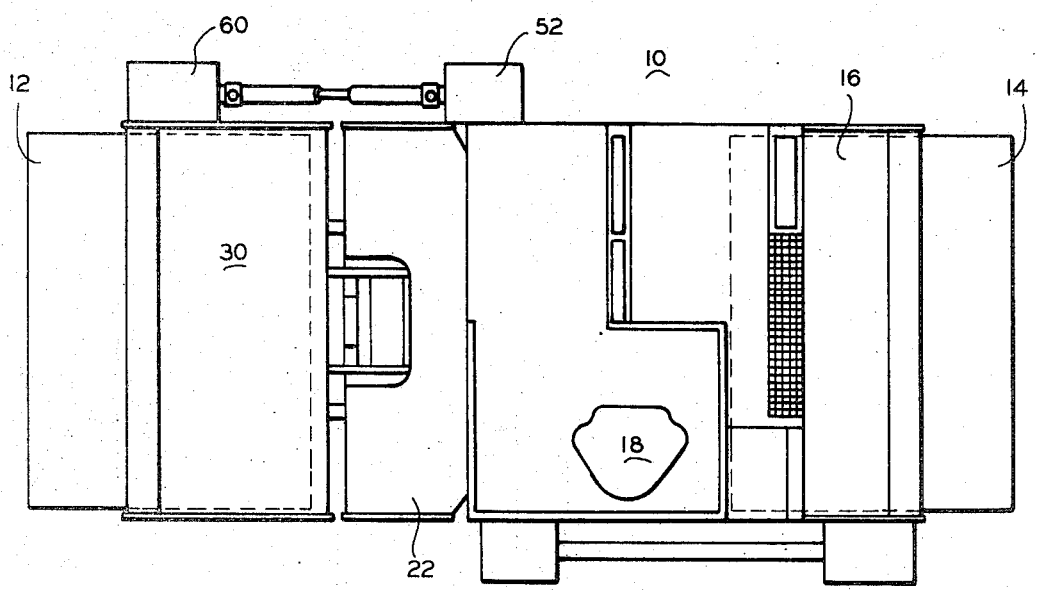
FIG. 1 of the drawing shows a schematic top plan view of a vehicle embodying one preferred embodiment of this invention.

The numeral 10 on the drawing indicates generally an articulated vehicle having cylindrical drums fore and aft which are arranged to be driven to propel the vehicle; and as the vehicle moves along the drums compact the ground or other material over which the vehicle is operating. In the vehicle illustrated the drum 12 is the front drum and drum 14 is on the rear of the vehicle although it will be appreciated that the vehicle will operate and perform equally well in either direction.

The rear part of the vehicle includes a frame structure indicated generally by the numeral 16 upon which the drum 14 is rotatably mounted about a transverse axis. The rear frame part 16, among other things, supports the operator's station which is indicated generally in FIG. 1 by the seat 18. As seen in FIG. 2, the rear frame portion also includes a pair of forwardly extending hinge or pivot portions 20 by which the front part of the vehicle is connected to form the vertically disposed pivotal connection between the two parts of the vehicle to provide for steering of the vehicle.

An intermediate structural portion 22 has a pair of rearwardly extending members 24 above and below each of the hinge portions 20, and pins 26 are provided to form the vertically disposed pivotal connection having axis 28.

Figure 5:
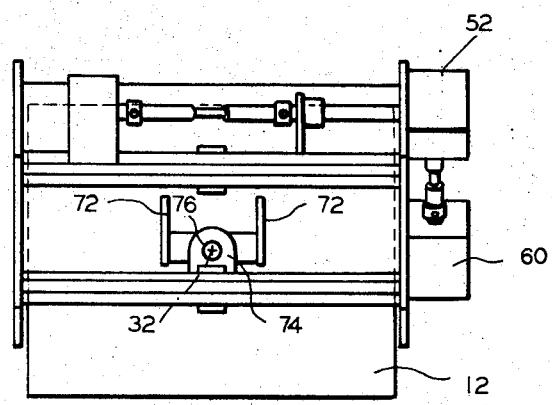
FIG. 5 is a view along the line 5-5 of FIG. 3 showing the horizontally disposed coupling.

The front part of the vehicle includes a frame structure 30 upon which the drum 12 is rotatably mounted, and frame 30 is pivotally mounted on intermediate structure 22 about a longitudinal horizontally disposed axis 32 as shown in greater detail in FIGS. 3 and 5.

FIG. 3 of the drawing has the operator's station and other upper portions of the rear part of the vehicle removed to expose an engine 34 which, through a hydraulic torque converter 36 in this typical case and through an intervening shaft 8 and a multiratio change speed transmission 40, drives the vehicle 10.

Transmission 40 has a double ended output shaft 41 (see FIG. 3). The inner end of shaft 41 is connected to a shaft 42 which includes universal joints 44 and 45 adjacent the ends and a slip joint 46. The opposite end of shaft 42 is supported by a bearing structure 48 which is secured to intermediate portion 22 of the vehicle and thus pivots about axis 28 as the vehicle is steered.

Shaft 42 in turn is connected to a shaft portion 50 which is a solid shaft in this first embodiment and which drives the input pinion of a 90° angle gear box 92. The output of gear box 52 drives a shaft 54 which includes universal joints 56 and 57 adjacent the ends and a slip joint 58, and shaft 54 is connected to another right angle gear box 60 the output of which is connected to and drives the drum 12.

The outer end of the output shaft 41 of the transmission drives the other drum 14 through a right angle gear box 62, a solid shaft 64 and another right angle gear box 66.

Figure 2:
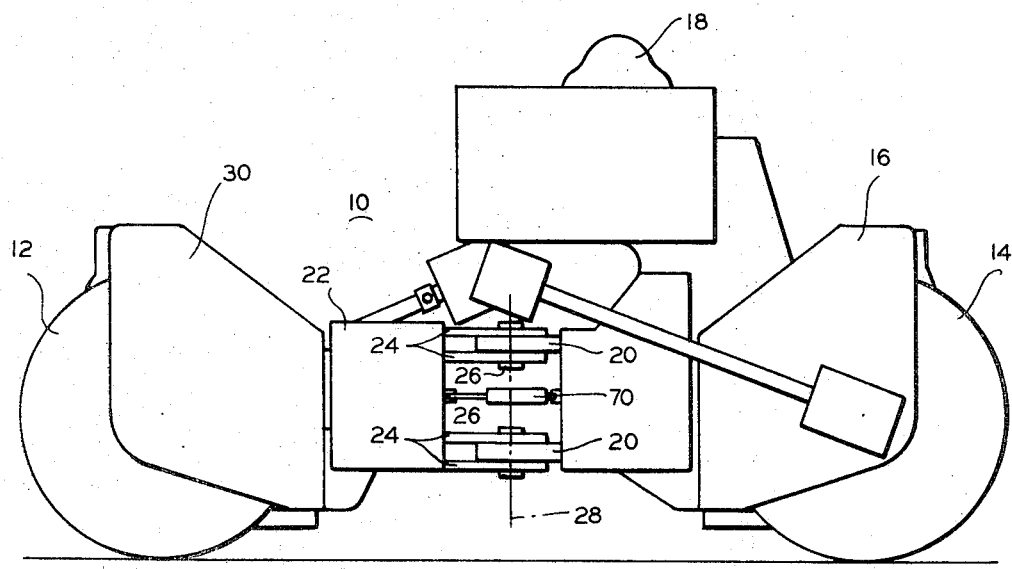
FIG. 2 shows a side elevational view of the vehicle of FIG. 1.

If the vehicle 10 were driven over perfectly level ground in a straight line all parts would remain in the positions indicated in FIGS. 1, 2 and 3. However, if it is desired to steer the vehicle the front part is pivoted with respect to the rear part by suitable means which in the mode illustrated comprises a pair of hydraulic actuators 70 (see FIG. 2) which are connected between the front and rear parts of the vehicle. Only one of these is visible in FIG. 2, but as will be readily apparent to those skilled in the art, there is a hydraulic actuator 70 on each side of the machine, and under control of the operator one is extended as the other is simultaneously retracted and this causes one part of the machine to pivot with respect to the other. As an example, FIG. 4 shows a condition in which the front part has pivoted with respect to the rear part approximately 35° and if the vehicle were driven forwardly it would accordingly turn to the left.

It will be observed in FIG. 4 that shaft 42 has shortened as a result of the turning action, the slip joint 46 in shaft 42 allowing such shortening. At the same time, the universal joints 44 and 45 in this shaft have allowed changes in angles, the angle accommodated by universal joint 44 increasing and that accommodated by universal joint 45 decreasing. Shaft 42 behaves in approximately this same manner in all three of the embodiments described and illustrated herein during turning of the vehicle although it will be appreciated that if the turn is to the right instead of to the left the axis of shaft 42 moves toward the vertically disposed pivot axis 28 instead of away from it. However, in all embodiments the horizontally disposed shaft 42 which is of adjustable length and can accommodate different angles at the ends thereof provides for the transfer of power from the part of the vehicle which carries the engine to the other part so that both parts may be driven under all conditions of operation.

As shown in the cutaway portion of FIG. 3 and in FIG. 5, the front frame portion 30 is pivoted on intermediate structural portion 22 to pivot about horizontally disposed axis 32. This is accomplished in the typical construction illustrated by means of a structural portion 72 which extends rearwardly from structure 30 and is pivotally connected by means of a pair of bosses 74 which are secured to intermediate structural portion 22, the bosses 74 and structure 72 being joined in the usual manner by a pair of pivot pins 76. As the vehicle traverses rough terrain this horizontally disposed pivotal connection permits the front part of the vehicle to pivot about the horizontally disposed axis 32 with respect to the remainder of the vehicle to accommodate the vehicle to such rough terrain.

Figure 6:
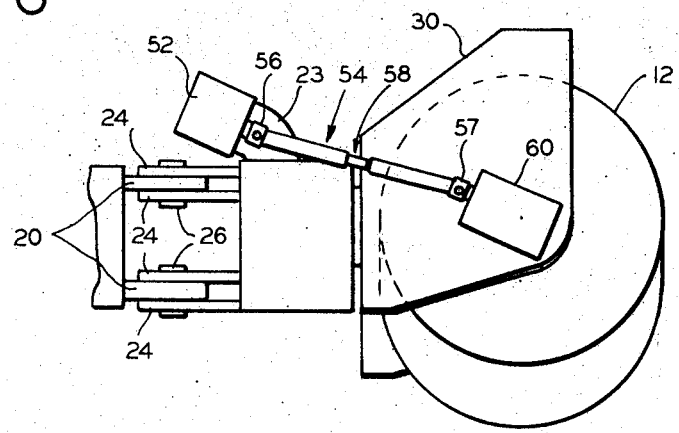
FIG. 6 is a side elevational view showing a part of the vehicle pivoted one way about the horizontally disposed axis.

FIG. 6 shows a partial side elevational view looking from the right side of the vehicle, that is, from the top of FIG. 3, which shows the front roller 12 and its supporting structure 30 pivoted about axis 32 so that the right side is up and the left side is down. It will be observed that the shaft 54 has shortened through the shortening action of the slip joint 58 and that the two universal joints 56 and 57 have changed angles somewhat to accommodate this tilting action.

Figure 7:
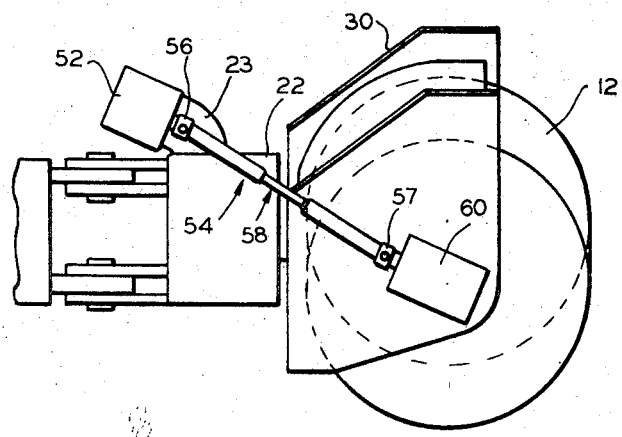
FIG. 7 is similar to FIG. 6, but shows the part pivoted the other way.

FIG. 7 shows another view from the same location in which the front roller has tilted in the opposite direction and the shaft 54 accordingly has extended with the consequent extension of the slip joint 58 and resulting changes in the angles of the universal joints. In the first preferred embodiment of the invention which has been described and illustrated in FIGS. 1 through 7 inclusive the gear box 52 is rigidly connected to intermediate structural portion 22 in a suitable manner such as by bracket 23 and thus all of the movements in the drive line to accommodate the tilting action of the front roller take place in shaft 54 and the parts thereof. Shafts 50 and 42 are not affected by such lateral pivoting action.

Figure 8:
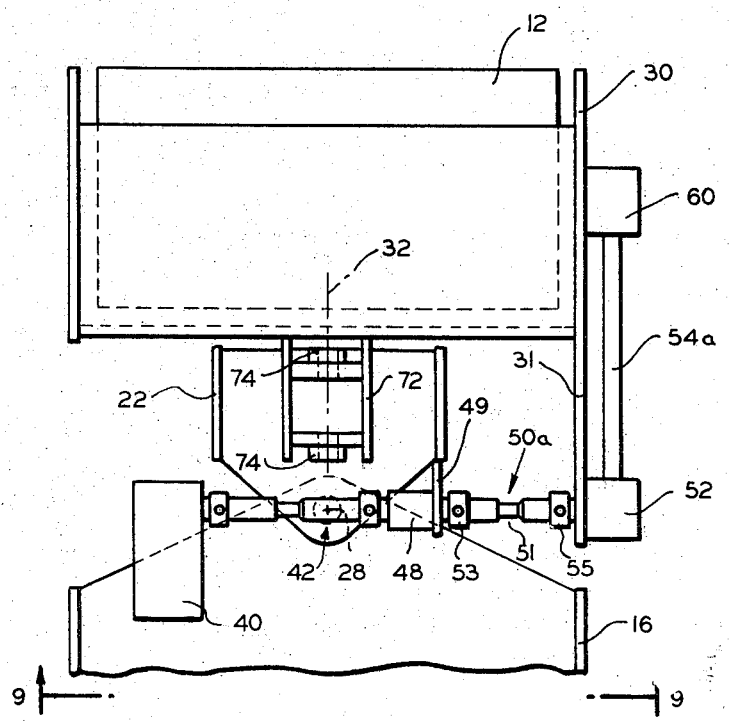
FIG. 8 is a partial view similar to FIG. 3 showing a second preferred embodiment of the invention.
Figure 9:
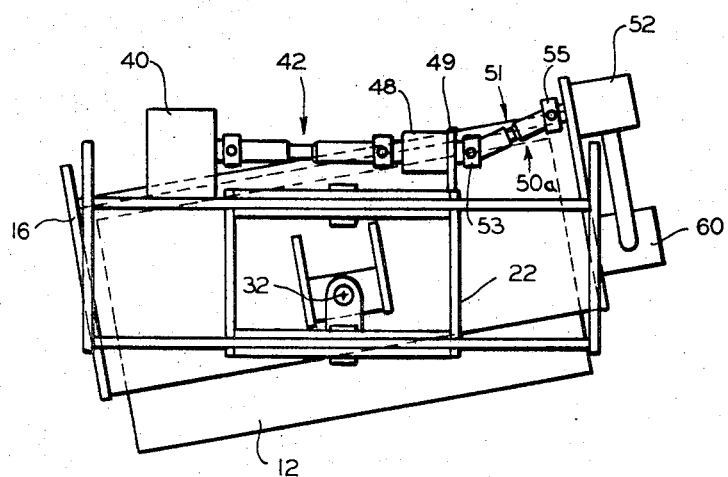
FIG. 9 is a view along the line 9-9 of FIG. 8 but showing one part pivoted about the horizontally disposed axis.

The second preferred mode or embodiment of our invention is illustrated in FIG. 8 and 9 of the drawing. In this embodiment, gear box 52 is connected solidly to frame 30 by means of interconnecting portion 31. This means that there is no relative motion between gear box 52 and gear box 60 as the front part of the machine pivots about the horizontally disposed axis 32 and as a result shaft 54 can be a solid shaft in this case and it is so indicated by the identifying character 54a in FIG. 8. In this embodiment bearing 48 is still mounted on intermediate structural portion 22, as indicated by bracket 49, although structural portion 22 is not as wide as in the first embodiment.

In this second embodiment, as the front part of the vehicle tilts or pivots back and forth about the horizontally disposed axis 32 the relative movement between frame 30 and intermediate structural portion 22 is accommodated by a shaft 50a which in this embodiment includes a slip joint 51 and a pair of universal joints 53 and 55 at the ends thereof. In FIG. 8 shaft 50a is shown in the normal position in which the front part of the vehicle is not pivoted from the normal horizontal position.

In FIG. 9 the vehicle is shown with the front part tilted so that the left side is down and the right side is up, looking from the operator's station toward the front of the machine, and the change in shaft 50a will be observed. The slip joint 51 has contracted and the angles of the two universal joints 53 and 55 have changed to accommodate the difference in elevation between the two ends of shaft 50 in this tilted position of the front drum 12.

Figure 10:
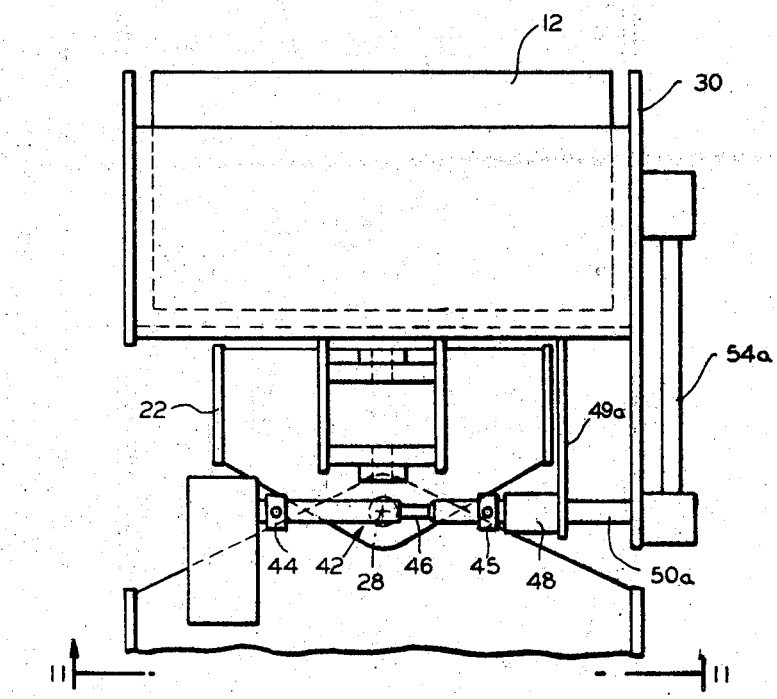
FIG. 10 is a partial view similar to FIG. 3 but showing a third preferred embodiment of the invention.
Figure 11:
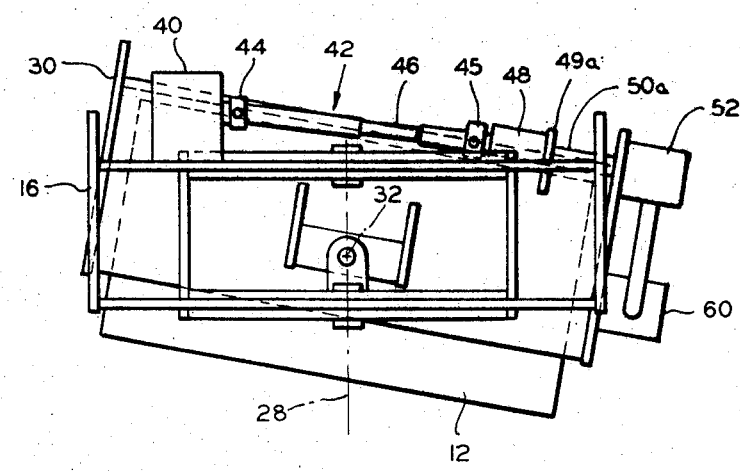
FIG. 11 is a view along the line 11-11 of FIG. 10 but showing one part pivoted about the horizontally disposed axis.

FIGS. 10 and 11 show a third preferred embodiment of the invention in which the bearing support 48 for the transverse drive shafting is mounted on the pivotal front structural portion 30 instead of on the intermediate structural member 22, by means of bracket 49a. This means that both shaft 50a and shaft 54a can be solid because there is no relative angular movement of either of these shafts as the front drum pivots about the longitudinal horizontally disposed axis 32.

In this embodiment the necessary movements in the elements of the drive line are absorbed entirely in shaft 42, that is, it accommodates both the transverse tilting movement about axis 32 as well as any pivoting movements for steering purposes about vertically disposed axis 28 which may occur either simultaneously with or separately from the transverse tilting movement of the front drum.

FIG. 10 shows the front part of the machine in the normal position in which it is not tilted; in this embodiment shaft 42 intersects axis 28 in the normal straight-ahead position. FIG. 11 shows the front part of the vehicle tilted about the longitudinal horizontally disposed axis 32 so that the right side is down and the left side is up. The position of the shaft 42 in FIG. 11 shows the action which has occurred as a result of such tilting action. This consists principally of changes in the angles of universal joints 44 and 45. Slip joint 46 extends some as a result of this transverse tilting action, although it will be appreciated that if the vehicle were turning at the same time, as illustrated in FIG. 4, then there would be corresponding additional movement of the slip joint 46.

Reference herein to a slip joint means any structure which provides for the transfer of torsional forces while at the same time permitting extension and contraction; a common form of such device is two pieces of metal telescopically arranged and interconnected by splines which permit the extension and retraction but at the same time provide for the transfer of torsional forces.

It will be appreciated also that it would be possible to substitute chain drives for the gears and shafts in some portions of the vehicle as shown in the accompanying drawing.

While we have shown the best contemplated mode and other preferred embodiments of our invention in accordance with the statute, it will be understood that modifications may be made without departing from the invention. It should be understood therefore that we intend to cover by the appended claims all such modifications which fall within the true spirit and scope of our invention.

We claim:

1. A drive arrangement for an articulated vehicle having two parts interconnected by a combined draft and steering coupling, such coupling including an intermediate structure to which a first part of the vehicle is pivotally connected about a longitudinal horizontally disposed axis and which is pivotally connected to the second part of the vehicle about a vertically disposed axis, the drive arrangement comprising an engine mounted on the said second part of the vehicle, a shaft driven by the said engine extending in transversely disposed relation adjacent the said vertically disposed axis, the said shaft including a universal joint and slip joint therein, a bearing mounted on the said intermediate structure and supporting the said shaft in part, a first mechanism along one side of the vehicle and connected to the said shaft for driving ground engaging propelling means for the first part of the vehicle, and a second mechanism along the other side of the vehicle and connected to the said engine for driving ground engaging propelling means on the second part of the vehicle.

2. A drive arrangement for an articulated vehicle as specified in claim 1 in which the said first mechanism includes a shaft having a universal joint and a slip joint therein.

3. A drive arrangement for an articulated vehicle as specified in claim 1 in which the said transversely disposed shaft is supported at one end by the said bearing, and there is an additional shaft portion between such bearing and the said first mechanism including a universal joint and a slip joint.